C. E. Werner.
Distilling App$^s$.
No. 119,436.    Patented Sep. 26, 1871.
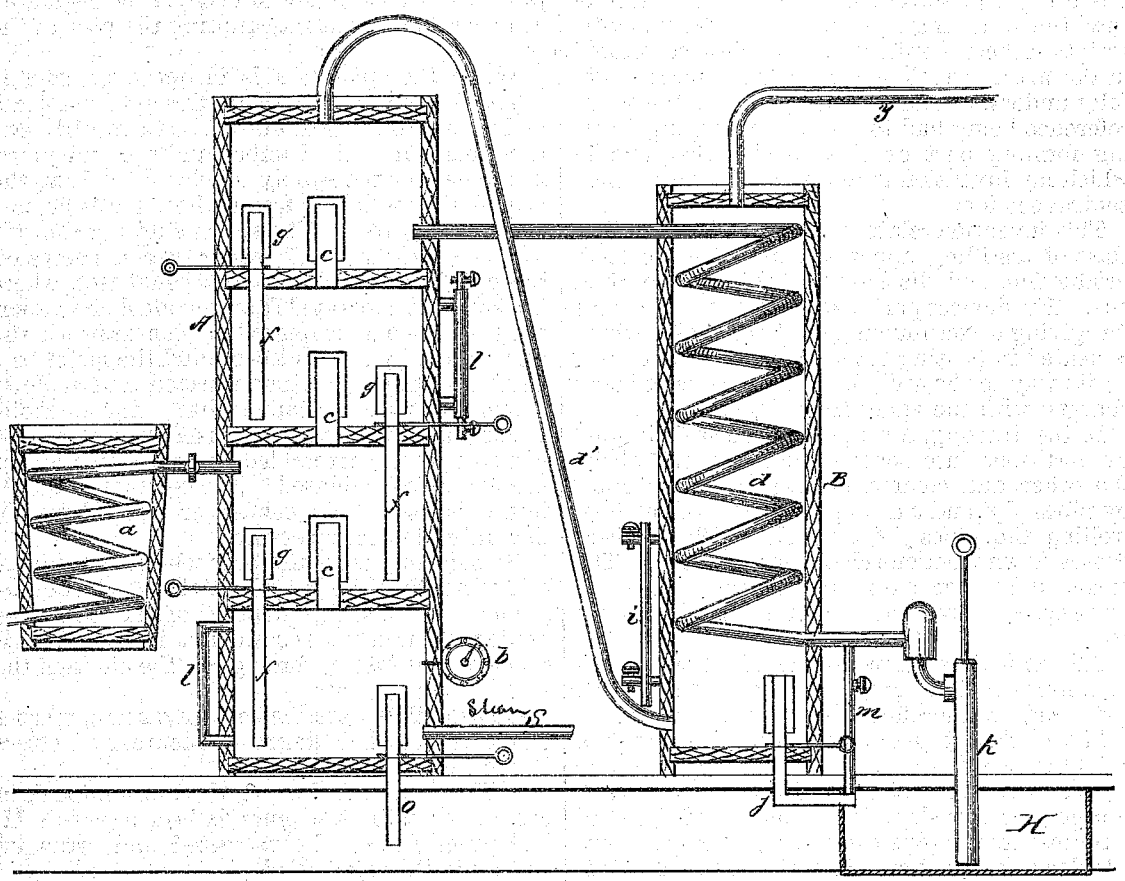

UNITED STATES PATENT OFFICE.

CARL ERNST WERNER, OF CANTON, ILLINOIS.

IMPROVEMENT IN APPARATUS FOR DISTILLING.

Specification forming part of Letters Patent No. 119,436, dated September 26, 1871.

*To all whom it may concern:*

Be it known that I, ERNST WERNER, of Canton, in the county of Fulton and State of Illinois, have invented a new and useful Improvement in Distilling Apparatus; and I do hereby declare that the following is a full, clear, and exact description thereof, sufficient to enable those skilled in the art to which my invention appertains to fully understand and to make and use the same, reference being had to the accompanying drawing forming part of this specification, and in which my invention is represented by a vertical central section.

This invention relates to improvements in that class of distilling apparatus in which the feed, production, and discharge of slop are continuous. The devices particularly refer to the means for giving a continuous supply of mash, which is heated in passing through a vapor-condenser on its way to the still, the condenser itself being charged with the vapor from the still.

In the drawing, A represents the still, divided by partitions into several chambers, one above the other, and communicating with each other by pipes $f f$ and $c c$. $g g$ are slide-valves controlling the pipes $f f$, through which the beer passes down from one chamber to another. The steam and vapor pass through the pipes $c$. $a$ represents a try-worm communicating with the still.

All the features thus far described are shown in Letters Patent granted to me January 24, 1854, and are therefore not now claimed.

$l l$ are glass tubes or indicators to show the height of beer in the still. $b$ is a gauge for showing the pressure of steam in the still. $o$ is a discharge-pipe for slop, at the bottom of the still. S represents the pipe through which steam from a boiler or generator enters the still. B represents the condenser, containing a worm, $d$, which communicates at the top with the upper chamber of the still and at the bottom with a pump, K, situated in the beer-reservoir H. $d'$ is a pipe running from the lower part of the condenser to the top of the still. $i$ is a glass indicator applied to the side of the condenser for showing the height of the beer therein. $j$ is a discharge-pipe from the condenser to the reservoir. This pipe is provided with a slide-valve. $m$ is a tube running from the worm-pipe down into the reservoir. This pipe has a stop-cock, to permit any required amount of return flow from the feed-pipe $d$, so that the flow of beer can be regulated at pleasure without interrupting the play of the pump.

When the apparatus is in operation beer is pumped from the reservoir through the worm and pipe into the still until it has attained a certain height in each chamber, and then the pump is stopped, or the supply regulated so that the beer shall run in no faster than it can be converted into vapor. The steam entering the still converts the beer into vapor, which passes off through the pipe $d'$ into the condenser, where the steam is separated from the alcoholic vapor, the steam being condensed by contact with the worm filled by the cold beer, and the latter (the beer) is at the same time warmed and made to enter the still in a heated state. The alcoholic vapor passes from the condenser through a pipe, $y$, into a worm surrounded by cold water, where the vapor is condensed. The condensed steam in the bottom of the condenser B is allowed to flow into the beer-reservoir.

By this apparatus the beer when it enters the still is nearly boiling, by heat absorbed from the vapor. Besides, this heating of the beer prevents the formation of a vacuum in the still, and no alcohol is lost by forcing out the air from the still.

Having thus described my invention, what I claim as new, and desire to secure by Letters Patent, is—

1. The doubler B having the worm-pipe $d$, in connection with the pump $k$, beer-reservoir H, and pipes $j m y$, all constructed and arranged substantially as specified.

2. The arrangement of the still A and doubler B communicating through the pipes $d d'$, pump $k$, and beer-well H, all constructed to operate substantially as described, for the purpose specified.

CARL ERNST WERNER.

Witnesses:
C. H. FITCH,
FRED. KNOOP.